United States Patent [19]

Reeves et al.

[11] Patent Number: 5,508,084

[45] Date of Patent: *Apr. 16, 1996

[54] REPOSITIONABLE ARTICLES HAVING A MICROSTRUCTURED SURFACE, KITS FOR PRODUCING SAME, AND METHODS OF USE

[75] Inventors: Mark E. Reeves, Maplewood; Diwakaran A. Ratnam, St. Paul, both of Minn.

[*] Notice: The term of this patent shall not extend beyond the expiration date of Pat. No. 5,234,740.

[73] Assignee: Minnesota Mining and Manufacturing Company, St. Paul, Minn.

[21] Appl. No.: 248,863

[22] Filed: May 24, 1994

Related U.S. Application Data

[63] Continuation-in-part of Ser. No. 929,685, Aug. 13, 1992, which is a continuation-in-part of Ser. No. 751,147, Aug. 28, 1991, Pat. No. 5,234,740.

[51] Int. Cl.$^6$ ...................................................... B32B 3/28
[52] U.S. Cl. .......................... 428/172; 428/141; 428/156; 428/346
[58] Field of Search ...................... 428/156, 172, 428/343, 76, 167, 178, 174, 95, 96, 346, 354, 542.8, 40

[56] References Cited

U.S. PATENT DOCUMENTS

| | | | |
|---|---|---|---|
| 3,585,101 | 6/1971 | Stratton et al. | 161/116 |
| 3,684,348 | 8/1972 | Rowland | 350/103 |
| 3,689,346 | 9/1972 | Rowland | 156/245 |

(List continued on next page.)

FOREIGN PATENT DOCUMENTS

| | | |
|---|---|---|
| 733014 | 4/1966 | Canada. |
| 2125305 | 9/1972 | France. |
| 2669543 | 5/1992 | France. |
| 263450A1 | 1/1989 | German Dem. Rep.. |
| 2807658A1 | 9/1979 | Germany. |
| 3203023A1 | 8/1983 | Germany. |
| 3703225A1 | 8/1988 | Germany. |
| 2062479 | 5/1981 | United Kingdom. |
| 8183005.5 | 8/1981 | United Kingdom. |
| 2057894 | 5/1983 | United Kingdom. |
| WO85/04592 | 10/1985 | WIPO. |

OTHER PUBLICATIONS

M. M. Koura, "The Effect of Surface Texture on Friction Mechanisms", Wear, vol. 63, No. 1, pp. 1–12 (1980).

U.S. Application Ser. No. 07/875,186, filed Apr. 28, 1992 (Rouser et al.).

Performance Bicycle catalog, p. 29, Autumn 1992, published by Performance Bicycle Shop of Chapel Hill, North Carolina.

Dialog News Release from Omnium Corp., "New . . . Anti-Static Mouse Pad," Jun. 15, 1987.

Dialog News Release from Educational Systems, Inc./MICROREF, "MICROREF Introduces Mousepad That Provides At-A-Glance Reference For Software," May 8, 1991.

Dialog News Release from Computer Retail Week, "Big Profit On Small-Change Items: Mouse Pads, Surge Protectors & Low-Cost Apps Among Fastest Movers," Aug. 10, 1992.

(List continued on next page.)

Primary Examiner—Donald J. Loney
Attorney, Agent, or Firm—Gary L. Griswold; Walter N. Kirn; Carolyn V. Peters

[57] ABSTRACT

A repositionable article having a microstructured surface is described which includes a removable and rebondable adhesive layer having first and second surfaces and a control layer having a control surface and a back surface, the second surface of the adhesive layer adhered to the back surface of the control layer, the control surface defined by an array of a plurality of precisely shaped raised regions and a plurality of recessed regions. The articles find use particularly as mouse pads.

48 Claims, 4 Drawing Sheets

U.S. PATENT DOCUMENTS

| | | | |
|---|---|---|---|
| 3,857,731 | 12/1974 | Merrill, Jr. et al. | 117/122 PA |
| 3,901,727 | 8/1975 | Loudas | 134/4 |
| 4,226,418 | 10/1980 | Balfour | 273/75 |
| 4,259,286 | 3/1981 | Louis et al. | 264/555 |
| 4,264,484 | 4/1981 | Patel | 260/29.6 F |
| 4,343,848 | 8/1982 | Leonard, Jr. | 428/156 |
| 4,364,723 | 12/1982 | Louis et al. | 425/384 |
| 4,478,769 | 10/1984 | Pricone et al. | 264/1.6 |
| 4,488,918 | 12/1984 | Jofs | 156/79 |
| 4,560,487 | 12/1985 | Brinkley | 252/8.75 |
| 4,576,850 | 3/1986 | Martens | 428/156 |
| 4,681,790 | 7/1987 | Fong | 428/96 |
| 4,691,387 | 9/1987 | Lopez | 2/161 A |
| 4,799,054 | 6/1989 | House | 340/710 |
| 4,866,602 | 9/1989 | Hall | 345/157 |
| 4,875,259 | 10/1989 | Appeldorn | 24/576 |
| 4,881,275 | 11/1989 | Cazares et al. | 2/161 A |
| 4,906,494 | 3/1990 | Babinec et al. | 428/35.2 |
| 4,959,265 | 9/1990 | Wood et al. | 428/343 |
| 5,022,170 | 6/1991 | House | 40/358 |
| 5,055,340 | 10/1991 | Matsumura et al. | 428/172 |
| 5,141,790 | 8/1992 | Calhoun et al. | 428/40 |
| 5,217,781 | 6/1993 | Kuipers | 428/85 |
| 5,234,740 | 8/1993 | Reeves et al. | 428/156 |

OTHER PUBLICATIONS

Dialog News Release from W. H. Brady Co., "BRADY Customized Mouse Pads," Jul. 1, 1989.

"Machine Design," Sep. 24, 1992, p. 92.

Product Packaging of "Multi-Pad," from Computer Coverup, Inc., 1992.

"Encyclopedia of Chemical Technology," 3rd Ed., vol. 3, pp. 149–183, John Wiley & Sons, New York, 1978.

U.S. Patent    Apr. 16, 1996    Sheet 4 of 4    5,508,084

REPOSITIONABLE ARTICLES HAVING A MICROSTRUCTURED SURFACE, KITS FOR PRODUCING SAME, AND METHODS OF USE

CROSS-REFERENCE TO RELATED APPLICATIONS

This application is a continuation-in-part of application Ser. No. 07/929,685, filed Aug. 13, 1992, which was a continuation-in-part of application Ser. No. 07/751,147, filed Aug. 28, 1991, now U.S. Pat. No. 5,234,740.

BACKGROUND OF THE INVENTION

1. Field of Invention

The present invention relates to printable, removable adhesive-fastened articles having a microstructured surface on their nonadhesive side, which are useful as a pad over which hand-held pointing devices may traverse.

2. Background Art

Many computers for use in the home or office are equipped with a hand-held pointing device, commonly referred to as a "mouse" because of their appearance. The mouse controls a pointer or cursor on the computer screen. A typical mouse has a rubber or rubber-coated "track ball" which contacts a surface, such as a desk top. Smooth and textured metallic track balls are also known. The track ball rolls within a socket within the mouse body. The mouse translates the movement of the track ball, in cooperation with the necessary computer hardware and software, into signals that tell the computer how to move the pointer.

Mice of the type previously described are generally referred to as mechanical mice. Other types of mice convert the movement of the track ball to an optical signal which is then converted into corresponding electrical signal (optomechanical mice).

A mouse will typically have one or more mouse buttons accessible to the user which the user may depress. In some cases, mouse buttons may be depressed simultaneously with the movement of the mouse across the surface, a procedure commonly known as "dragging." Dragging lets the user select a portion of the screen or move objects around the screen. In some mice of the type described, moving the mouse slowly results in small movements of the pointer, while moving the mouse faster results larger pointer movements.

In all of the above-mentioned mouse movements, both the mouse-to-pointer movement relationship and comfort are important to the user. It is frequently desired to cover large distances on the screen with minimum mouse movement, while retaining precise pointer control when the pointer approaches the desired object. It is also preferable to move the mouse with as much comfort to the user's hand and wrist as possible, avoiding step-like movements as might accompany the hand traversing a raised edge of the desk, or jerky movements across the desk made possible by dust, dirt, oil or food particles on the desk.

It is common for human users of interactive computers employing a mouse, particularly in office and home settings, to place the computer on decorative wooden or other furniture which may be subject to scratches and dents by mouse movements. If the furniture is wood, oils or other slippery materials may be present in furniture polish. These materials, food grease and food particles, dust, dirt, and the like, may accumulate on such surfaces and come between the mouse and the surface thus rendering the mouse movement on the pad, and the cursor movement, less effective than desired. As such, most users would rather not have the mouse traverse the surface of the desk per se, but commonly employ a "mouse pad" to both protect the surface and retain precision pointer movements. One popular mouse pad comprises a thin woven or nonwoven surface over which the mouse traverses, and the nonwoven or woven material may have logos, advertisements, or other graphic symbols printed thereon. Adhered to one side of the woven or nonwoven material opposite the side the mouse traverses is typically a flexible foam which is perhaps 0.125 to 0.5 inch (0.32 to 1.27 cm) thick. This foam backing may have a plurality of rubbery, knobby protuberances on its bottom surface (away from the mouse traversing surface) which provide frictional non-slip contact with the desk or other surface.

Home and office computer users also frequently desire to personalize their work stations. Mouse pads are available having means for changing graphic designs within an envelope created between the mouse-traversing surface layer of the pad and a base layer. The base layer is typically an open cell neoprene sponge rubber or other resilient layer to isolate the mouse traversing surface of the pad from unevenness in the desk upon which the mouse pad is placed. Unfortunately, the foam pads tend to present an uncomfortable step which the user's hand must traverse, at times presenting the user's wrist with an uncomfortable movement. Mouse pads of this type thus sacrifice some user comfort for precision in locating the cursor on the computer screen.

It would be an advancement in the mouse pad art to provide a pad which is more comfortable to the user than those having a thick backing, and which may be changeably customized or personalized to alternatively display family photos, important computer commands, cartoons, and the like on the pad. It would also be advantageous if the pad could easily be temporarily immobilized on the desk or other surface, then removed and moved to another surface, without damage to the surface and without leaving a residue on the surface. It also would be desirous to have a mouse pad having a uniform texture with good aggressive grab to the track ball providing a smooth, uniform, and predictable movement to the pointer on the screen, but not abrasive to the user's hand, while being possible of manufacture from almost any plastic material such as urethane or polyethylene.

SUMMARY OF INVENTION

In accordance with the present invention, repositionable articles having a microstructured surface are presented which are useful as a repositionable control surface for a personal computer pointing device (including a mouse or data pen). The articles of the invention may also serve as repositionable drink coasters and airline tray covers. The inventive articles can be adhered either permanently or temporarily to a surface, and can be repeatedly attached and removed from a surface. The articles may be customized with artwork, either by printing on the obverse or through a lamination process.

The articles of the invention have a control surface which is soft to the human touch, the control surface defined by an array of a plurality of precisely shaped raised regions and a plurality of recessed regions. The raised regions are preferably pyramidal. The phrase "an array of a plurality of precisely shaped raised regions and a plurality of recessed regions" is meant to distinguish over articles, such as paper, which have a smooth surface but microscopically have a textured surface.

Articles of the invention are especially useful as repositionable mouse pads due to excellent mouse tracking ball contact with the control surface. As the control layer may be formulated to contain water and oil repellant and soil resistant additives (or the control surface coated with same), the control surface will not get dirty from finger tip oils. The control layer is non-porous, will not shed lint and can be cleaned easily. Do to these properties, the articles of the invention advantageously keep the track ball cleaner for extended time periods.

In one embodiment the repositionable article having a microstructured surface comprises:

a) a removable and rebondable adhesive layer having first and second surfaces;

b) a control layer having a control surface and a back surface, the second surface of the adhesive layer adhered to the back surface of the control layer, the control surface defined by an array of a plurality of precisely shaped raised regions and a plurality of recessed regions.

Preferred articles of the invention are those wherein the removable and rebondable adhesive layer comprises an adhesive which is permanently bonded to the back surface of the control layer but remains rebondable to a surface such as a desk top and the like. Also preferred are control layers which are modified to include optional antistatic agents, water, oil and soil resistant additives and/or coatings, pigments and/or dyes, and the like, and those control layers which have printed information on the obverse. Optionally, the control surface may have these types of additives applied by the user as coatings from spray containers, as is commonly known.

As used herein the terms "removable and rebondable" and "repositionable", when referring to an adhesive layer, are interchangeable terms, and mean that the adhesive permits repeated cycles in which materials are alternatively bonded thereto and removed therefrom, while the adhesive is permanently retained on the back surface of the control layer. One suitable repositionable adhesive is the adhesive system described in the portion of assignee's U.S. Pat. No. 3,857,731 extending from column 2, line 1 through column 10, line 47, which portion is incorporated by reference herein. This adhesive system comprises a binder material having embedded therein and protruding from the exposed surface thereof, elastomeric, inherently tacky, acrylate copolymer microspheres. This adhesive system is further described herein. Adhesives exhibiting a peel adhesion ranging from about 2 to about 25 ounces per inch of width (about 22 to about 275 grams per cm of width) in a standard peel adhesion test are preferred.

In a second embodiment the repositionable article having a microstructured surface comprises:

a) a removable and rebondable first adhesive layer having first and second surfaces;

b) a substrate layer having first and second surfaces, the second surface of the first adhesive layer adhered to the first surface of the substrate layer;

c) a second adhesive layer having first and second surfaces, the first surface of the second adhesive layer adhered to the second surface of the substrate layer; and d) a control layer having a control surface and a back surface, the back surface adhered to the second surface of the second adhesive layer, the control surface defined by an array of a plurality of precisely shaped raised regions and a plurality of recessed regions.

Preferred are those articles of the second embodiment in which the substrate layer is selected from the group consisting of plastic and paper, and the second adhesive layer is a permanent adhesive. The substrate layer may also be a foamed material, such as foamed neoprene, but this is not particularly preferred. The control surface preferably consists of a uniform array of a plurality of pyramids each having a height ranging from about 0.001 inch to about 0.040 inch (about $2.54 \times 10^{-3}$ to about 0.1 cm). A graphic design may be adhered between the substrate layer and the second adhesive, or the design may be printed on the back surface of the control layer.

The articles of the first and second embodiments optionally include a release liner material removably attached to the rebondable adhesive.

Another embodiment of the invention is a kit adapted to be manipulated by the user to form a repositionable article having a microstructured surface. A first kit embodiment comprises:

a) a first sheet member consisting of:
1) a first release liner material having first and second surfaces;
2) a first adhesive layer having first and second surfaces, the second surface of the first adhesive layer removably adhered to the first surface of the first release liner material; and
3) a control layer having a control surface and a back surface, the back surface of the control layer adhered permanently to the first surface of the first adhesive layer, the control surface defined by an array of a plurality of precisely shaped raised regions and a plurality of recessed regions; and b) a second sheet material consisting of:
1) a second release liner material having first and second surfaces;
2) a removable and rebondable second adhesive layer having first and second surfaces, the second surface of the second adhesive layer adhered to the first surface of the second release liner material; and
3) a substrate layer having first and second surfaces, the second surface of the substrate layer adhered to the first surface of the second adhesive layer, and the first surface of the substrate layer adapted to be permanently adhered to the first surface of the first adhesive layer when the first release material is removed from the first adhesive layer and the first adhesive layer and substrate layer are joined.

Preferred are those kits comprising a graphic layer, the graphic layer positioned either between the first adhesive layer and the control layer (or printed on the back surface of the control layer), or adhered to the second surface of the substrate layer.

Another kit embodiment, adapted to be manipulated by the user into a repositionable article having microstructured surface, comprises:

a) a first sheet material having a control surface and a back surface, the control surface defined by an array of a plurality of precisely shaped raised regions and a plurality of recessed regions; and b) a second sheet material comprising:
1) a first release material having first and second surfaces;
2) a removable and rebondable adhesive layer adapted to be attached to the back surface of the control layer, the adhesive layer having first and second surfaces, the second surface of the adhesive layer removably adhered to the first surface of the first release material; and
3) a second release material having first and second surfaces, the second surface of the second release material removably adhered to the first surface of the adhesive layer.

Yet another embodiment of the invention is a repositionable article having a microstructured surface comprising:

a) a removable and rebondable first adhesive layer having first and second surfaces;

b) a first substrate material having first and second surfaces, the second surface of the first substrate material adhered to the first surface of the first adhesive layer;

c) a second adhesive layer having first and second surfaces, the second surface of the second adhesive layer adhered to the first surface of the first substrate layer;

d) a second substrate layer having first and second surfaces, the second surface of the second substrate layer adhered to the first surface of the second adhesive layer;

e) a third adhesive layer having first and second surfaces, the second surface of the third adhesive layer adhered to the first surface of the second substrate material; and f) a control layer having a control surface and back surface, the back surface of the control layer adhered to the first surface of the third adhesive layer, the control surface defined by an array of a plurality of precisely shaped raised regions and a plurality of recessed regions.

Preferred are those articles within this embodiment wherein a graphics layer is positioned between the second substrate layer and the third adhesive layer.

Still another embodiment of the invention is a repositionable article having a microstructured surface comprising:

a) a removable and rebondable first adhesive layer having first and second surfaces;

b) a substrate layer having first and second surfaces, the second surface of the substrate layer adhered to the first surface of the first adhesive layer;

c) a second adhesive layer having first and second surfaces, the second surface of the second adhesive layer adhered to the first surface of the substrate layer;

d) a control layer having a control surface and a back surface, the back surface of the control layer adhered to the first surface of the second adhesive layer, the control surface defined by an array of a plurality of precisely shaped raised regions and a plurality of recessed regions.

Another kit of the invention includes first and second sheet-like articles, the kit comprising:

a) the first sheet-like article consisting of:
1) a first release material having first and second surfaces;
2) a first adhesive layer having first and second surfaces, the second surface of the first adhesive layer removably adhered to the first surface of the first release layer; and
3) a control layer having a control surface and a back surface, the back surface adhered to the first surface of the first adhesive layer, the control layer defined as above; and b) said second sheet-like article consisting of:
1) a second release material having first and second surfaces;
2) a removable and rebondable second adhesive layer having first and second surfaces, the second surface of the second adhesive layer removably adhered to the first surface of the second release material;
3) a first substrate layer having first and second surfaces, the second surface of the first substrate layer adhered to the first surface of the second adhesive layer;
4) a third adhesive layer having first and second surfaces, the second surface of a third adhesive layer adhered to the first surface of the first substrate layer; and
5) a second substrate layer having first and second surfaces, the second surface of the second substrate layer adhered to the first surface of the third adhesive layer.

An alternative kit including first and second sheet-like articles comprises;

a) a first sheet-like article consisting of a control layer having a control surface and a back surface, the back surface adapted to be contacted with a second sheet-like article, the control surface defined as above; and b) a second sheet-like material consisting of:
1) a first release material having first and second surfaces;
2) a removable and rebondable first adhesive layer having first and second surfaces, the second surface of the first adhesive layer removably adhered to the first surface of the first release material;
3) a substrate layer having first and second surfaces, the second surface of the substrate layer adhered to the first surface of the first adhesive layer;
4) a second adhesive layer having first and second surfaces, the second surface of the second adhesive layer adhered to the first surface of the substrate layer; and
5) a second release material having first and second surfaces, the second surface of the second release material removably adhered to the first surface of the second adhesive layer, the second release material and the first release material adapted to be removed from the second sheet-like article, and the first surface of the second adhesive layer adapted to be adhered to the second surface of the control layer.

The articles of the invention may be:

(a) packaged flat with overlapping articles, wherein the adhesive is covered with a release liner;

(b) packaged flat with overlapping articles, adhesive unlinered;

(c) rolled onto itself such that the adhesive is not exposed but is covered up by subsequent layers.

(d) folded onto itself, adhesive against adhesive, such that the rebondable adhesive remains clean until used.

Thus, the invention further includes a support article from which repositionable articles can be removed, the support article comprising a plurality of repositionable articles each having a microstructured surface, each repositionable article comprising:

a) a removable and rebondable adhesive layer having first and second surfaces;

b) a control layer having a control surface and a back surface, the back surface of the adhesive layer adhered to the back surface of the control layer, the control surface defined by an array of a plurality of precisely shaped raised regions and a plurality of recessed regions, the repositionable articles being relatively disposed so that at least a portion of the control surface contacts at least a portion of the first surface of the adhesive layer of an underlying repositionable article. Preferred support articles are those wherein the repositionable articles are disposed in the form of a stack or roll of repositionable articles, and support articles upon which are mounted one or more of the repositionable articles.

A final embodiment comprises a repositionable article having a microstructured surface comprising:

a) a non-adhesive, high friction layer having first and second surfaces;

b) a control layer having a control surface and a back surface, the second surface of the non-adhesive, high friction layer adhered to the back surface of the control layer, the control surface defined by an array of a plurality of precisely shaped raised regions and a plurality of recessed regions.

It will be understood that the repositionable adhesive in all other embodiments may be substituted with the non-adhesive, high friction materials.

There are many advantages of the articles and kits of the present invention when used as mouse pads when compared with the conventional foam-backed mouse pads. Preferably, the articles of the invention are constructed such that the total thickness (i.e. the thickness measured from the desk or table surface to the point of the article most distal from the desk surface) is less than ¼ inch (6.35 mm), preferably less than ¹⁄₁₆ inch (about 1.6 mm), but in all cases more than 0.05 mm. In survey tests of users comparing the inventive articles with those of the type having ¼ inch or greater thick foam backing, it was found that thicknesses within these ranges endow the inventive articles with significant ergonomic advantage. The inventive article's low height (i.e. low thickness value) still allows the area of the desk or other surface covered by the article (sometimes referred to as the "mouse area") to be used as a normal desk surface. Papers can easily be slid over it, as can a keyboard. The control layer film is preferably transparent. Graphic artwork can be laminated to the obverse yet remain clear and legible, and the size and shape of the inventive articles can be easily customized using scissors.

The inventive articles are of suitable flexibility such that they will lay flat on a surface even after being flexed. The inventive articles are preferably sufficiently resilient so that the article bends as it is peeled off a desk or other surface, but which is supple so that the article flattens out easily upon reattaching to the desk. Typically, articles of the invention are sufficiently flexible to be wound about themselves on a 1 inch (2.54 cm) diameter mandrel.

The control surface may have a border or other defined portion which is not microstructured. For example, the peripheral border of the control surface may be stippled such that it is similar to the surface obtained by plasma coating. Alternatively, a portion or all of the control surface may be created through a knurling process yielding less uniform results.

The control layer of the articles of the invention has a control surface defined by an array of precisely shaped protrusions, preferably pyramids or pyramidal frustums, that are specially configured to provide desired traction control properties. Although uniform, nonrandom arrays are preferred in some instances, random arrays may be preferred in other end uses.

Adapted to be repositionably secured to the surface of a desk or other apparatus, the articles of the invention comprise at least one of (1) a repositionable adhesive layer on the surface of the article proximal to the desk surface, or (2) a high-friction surface which replaces the repositionable adhesive, such as a coating of rubber (neoprene, chloroprene, and the like), or (3) the control layer can be adhered to a desk or other surface through the use of surface tension effects, through a vacuum formed by air exclusion or through a highly plasticized control layer or substrate layer that "wets out" the desk surface, in much the same fashion as non-adhesive vinyl decals are adhered to a surface. Useful highly plasticized, non-adhesive layers may comprise a plasticized rubber such as neoprene. It is most preferred to utilize a repositionable adhesive, such as that known under the trade designation "Post-It", which is described in the previously mentioned '731 patent.

Alternatively, the control layer may have applied on its back surface a "slidable" pressure-sensitive adhesive such as those described in U.S. Pat. No. 5,141,790, incorporated by reference herein. This allows the inventive articles to be moved into place and then adhered by hand pressure. The adhesives described in the '790 patent comprise a plurality of spaced clumps of particles substantially uniformly distributed over and protruding from one face of the pressure-sensitive adhesive layer, the tips of the clumps of particles being substantially free from the pressure-sensitive adhesive. Preferably, the individual particles are smaller than the thickness of the pressure-sensitive adhesive layer, and substantially every clump extends to a height above the surface of the pressure sensitive adhesive layer that exceeds the average size of the particles. The particles are preferably microspheres of adhesive such as those described in U.S. Pat. No. 3,691,140, further described herein below.

The control surface of the invention may be tailored (by proper combination of microstructure, composition and transparency) so that the array of precisely shaped protrusions and recesses defining the control surface creates an optical effect, such as Moire patterning or "image shifting." That is, the image changes with viewing angle.

In another of its embodiments, the invention relates to an article comprising a control layer having a control surface and a back surface, the control surface comprising an array of precisely shaped protrusions in the form of posts having bases in the plane of the control layer. In one embodiment the posts have non-planar sides which taper radially inwardly from their bases to their tops, the posts preferably comprising cones or conical frustums which have substantially circular bases. In another embodiment, the posts are essentially right cylinders of constant diameter from their base to their tops. This latter arrangement produces a matte surface texture comprised of a great number of plateau-like protrusions scattered at random on the surface and each having a top at the same level.

BRIEF DESCRIPTION OF THE DRAWING

FIG. 7 illustrates an embodiment which is an alternative to the embodiment illustrated in FIG. 3a;

DESCRIPTION OF PREFERRED EMBODIMENTS

Figure 1:
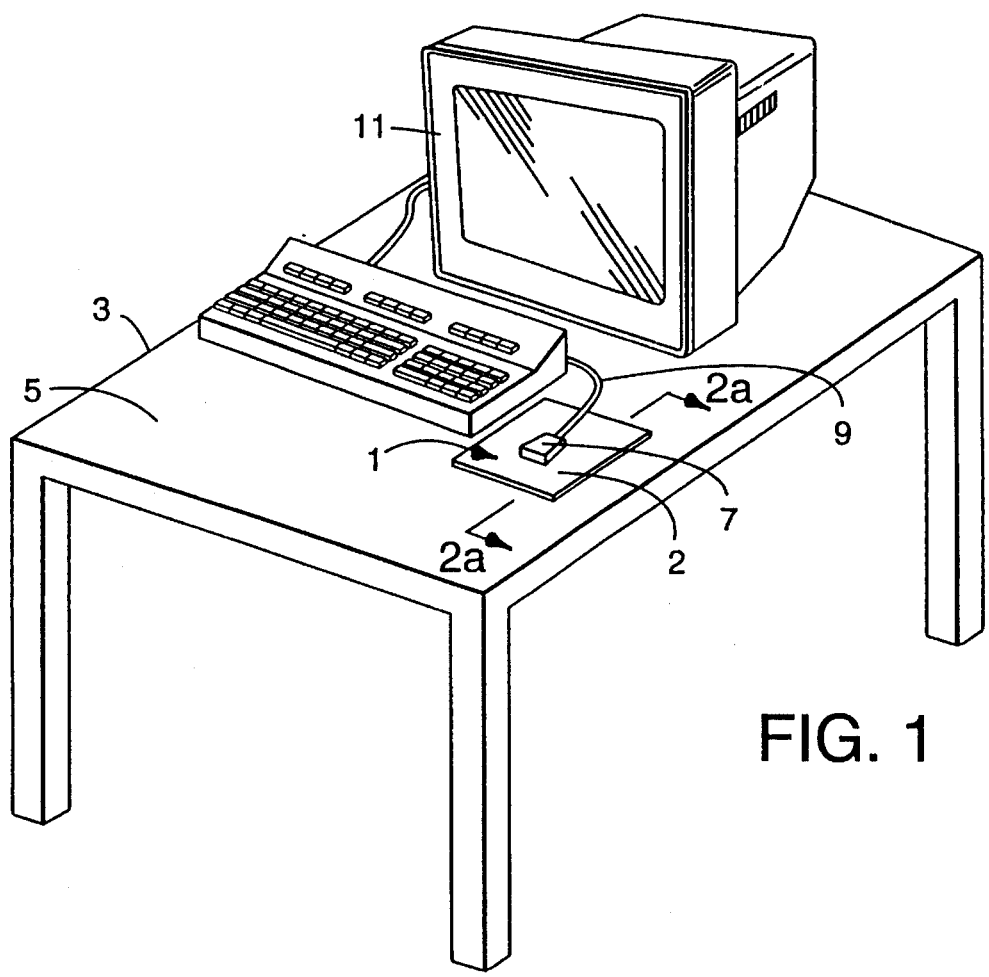
FIG. 1 is a perspective schematic view of a computer work station including a mouse and mouse pad.

FIG. 1 illustrates in perspective schematic a mouse pad 1 having a control surface 2, mouse pad 1 lying essentially horizontally on a table or desk 3 having a top surface 5. A mouse 7 is shown resting on control surface 2, mouse 7 having wire 9 connecting it to a computer 11.

Figure 1A:
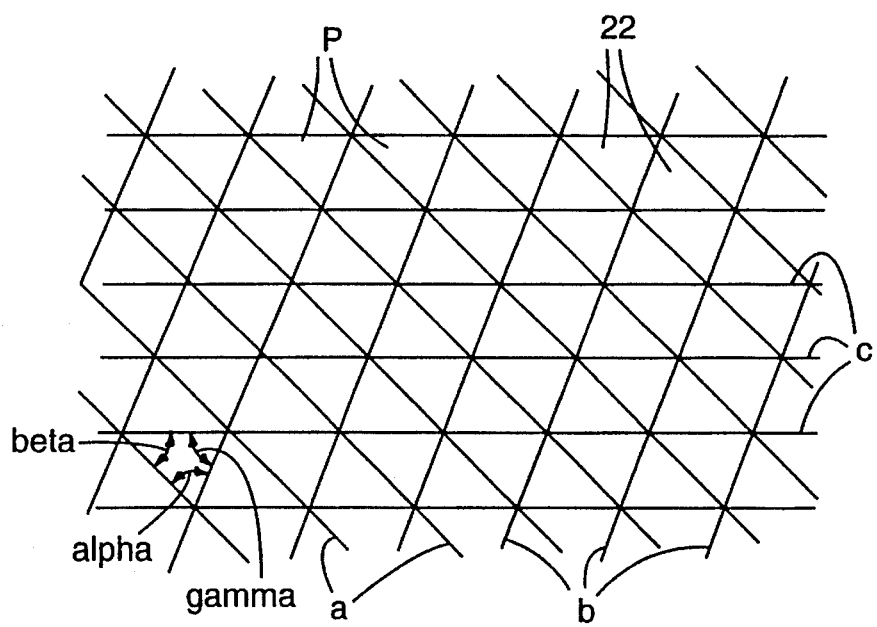
FIG. 1a is a plan view of a portion of the control surface of an illustrative mouse pad of the invention.

FIG. 1a is an illustrative embodiment of a preferred control surface 2 of the mouse pad of the invention. A pattern of three intersecting sets of parallel v-shaped grooves yields the structured control surface 2. The apexes of each set of grooves are identified as a, b, and c. The base of each individual protrusion 22 is defined by one groove of each of the three sets. As mentioned above, the three sides of the base of each three-sided pyramid are typically relatively equal in length. This can be controlled by selection of the intersection angles between the three sets of grooves, i.e., alpha, beta, and gamma. Each side of the base of a pyramidal protrusion and the peak of that protrusion defines a plane, referred to herein as a face of the protrusion. The faces of each protrusion are preferably relatively equal in area.

The direction parallel to each set of grooves is referred to herein as a major axis of the control surface. Thus, the article illustrated in FIG. 1a has three major axes. The maximum grip or friction provided by control surfaces of this type is obtained in a direction perpendicular to one of the major axes of the control surface. In some instances, articles of the invention are characterized as having directional gripping characteristics.

In a second embodiment of the invention (not illustrated), the protrusions comprise posts having non-planar sides and bases on the control layer. The posts taper radially inwardly from their bases to their tops. Preferably, the posts comprise substantially circular bases and the posts are either cones or conical frustums. Most preferably, land areas separate adjacent ones of the bases of the posts.

With respect to articles of the invention in general, if the protrusions comprise pyramidal or conical frustums, each frustum typically has a planar top or upper surface which is parallel to its base, although it is contemplated that the planar top or upper surface of the frustum can be inclined at an angle relative to the frustum's base. Further, the tops or upper surfaces of the frustums are not necessarily planar.

If the control surface of an article of the invention is defined by pyramids or cones, it is typically preferred, but not essential, that the peak of the pyramid or cone be centered over the geometric center of the base of the pyramid or cone. If the control surface of the article is defined by pyramidal or conical frustums, it is preferred, but not essential, that the planar tops of the frustums have geometric centers which are centered over the geometric centers of their respective bases. In some instances, if the protrusions of a control layer have peaks or planar tops which are "horizontally offset" from their respective bases, the sheeting may have directional gripping characteristics as a result. Articles having directional gripping characteristics would likely be considered desirable in many envisioned applications.

With respect to any embodiment of the invention, the protrusions are typically between about 3 mils and about 21 mils (75 and 525 micrometers), preferably between about 5 mils and 9 mils (125 and 225 micrometers), and most preferably about 7 mils (175 micrometers), in height. In some embodiments, the control layer can comprise protrusions up to about 30 mils (750 micrometers) in height, although such control layers may tend to be abrasive to one's skin. As used herein and illustrated in FIG. 2a, the height h of a protrusion refers to the length of the shortest possible line segment extending from the protrusion's peak P to its base. The protrusion's peak is defined to be the highest point of the protrusion, i.e., the point of the protrusion located furthest from the plane in which the base of the protrusion lies.

The shape of a protrusion is characterized by its aspect ratio, which is defined as the ratio of the protrusion's height h to its equivalent base diameter $D_{eq}$. Where the base of the protrusion is a circle, the equivalent base diameter $D_{eq}$ is simply the diameter of the circle. Where the base of the protrusion is not a circle, the equivalent base diameter $D_{eq}$ is defined as the diameter of a hypothetical circle having the same area as the base. It is believed that the invention can be practiced satisfactorily if the protrusions have an aspect ratio which is from about 0.1 to about 5. Most preferably, the aspect ratio for pyramidal protrusions is from about 0.3 to about 0.6, and the aspect ratio for protrusions which are tapered posts is about 2.

Figure 2A:
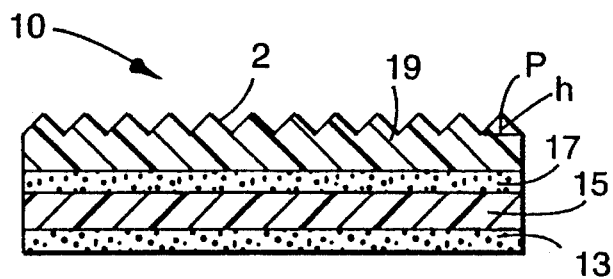
FIGS. 2a–2f are cross-section views taken along the section 2a–2a as shown in FIG. 1.
Figure 2B:
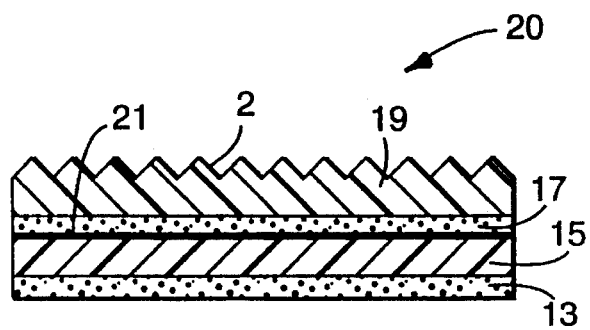
Figure 2C:
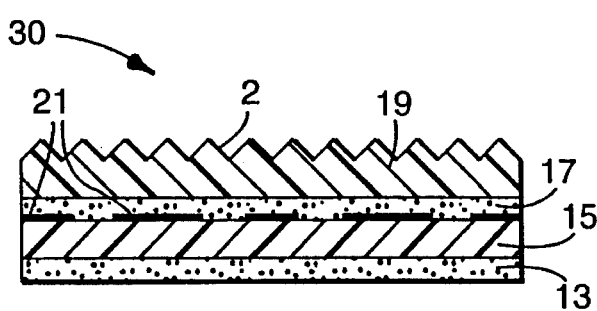
Figure 8:
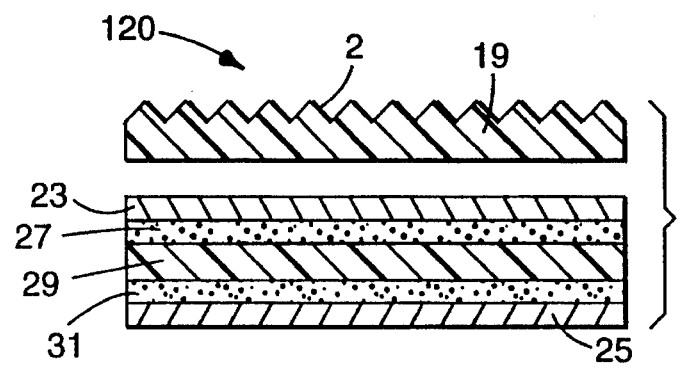
FIG. 8 is a cross-section of an alternative to the embodiment illustrated in FIG. 4.
Figure 2D:
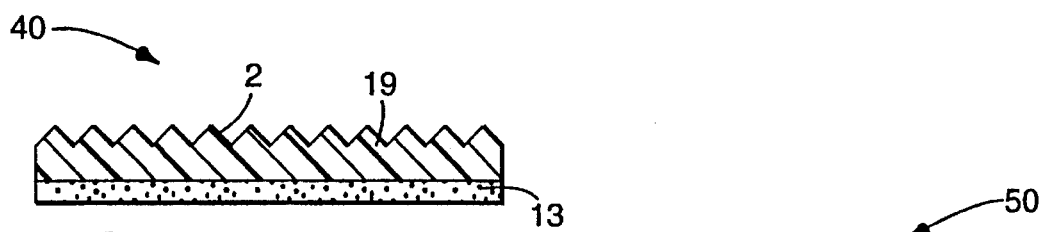

Referring to FIG. 2d, layers 15 and 19 typically comprises a polymeric film selected from, for example, the group consisting of polyvinyls, polyurethanes, polyesters, e.g., polyethylene terephthalate, polyacrylics, polycarbonates, polyolefins, and mixtures thereof. Polyurethanes are presently preferred because they typically yield control surfaces which offer an optimum combination of high toughness and durability coupled with high softness and flexibility. Polyacrylics typically yield articles that are relatively rigid.

Control layer 19, excluding the height of the protrusions, is typically between about 2 mils and about 100 mils (50 and 2,500 micrometers) thick, and most preferably between about 4 mils and about 20 mils (100 and 500 micrometers) thick.

FIGS. 2a–2f illustrates article embodiments 10, 20, 30, 40, 50 and 60, respectively, in cross-section along the line 2a–2a of FIG. 1. Embodiment 10 (FIG. 2a) comprises a removable and rebondable adhesive layer 13 to which at least one major surface is adhered to a plastic layer 15, which in turn has another adhesive layer 17 adhered over the plastic layer 15.

A suitable removable and rebondable adhesive is available from Minnesota Mining and Manufacturing Company, St. Paul, Minn. ("3M") under the trade designation "Post-It", which comprises inherently tacky elastomeric acrylate copolymer microspheres as disclosed in claimed in commonly assigned U.S. Pat. Nos. 3,691,140, and 3,857,731, both incorporated herein by reference. The '140 patent teaches that the copolymer microspheres disperse in various solvents to form suspensions which can be utilized in aerosol spray applications. When a substrate is sprayed on such suspensions and the solvent thereafter evaporated, there results a continuous coating of mildly tacky pressure-sensitive adhesive. Paper and the like can be applied to the surface of the coating, removed, repositioned, and rebonded. It had been found, however, that during removal of an adhered object, some of the particular adhesive spheres would transfer to the surface of the object, reducing the number of spheres on the originally coated substrate. Therefore, a substrate having the adhesive sprayed thereon would soon lose its tacky nature, and after repeated applications and removals, subsequent objects would eventually not adhere thereto. The invention of the '731 patent solved this problem by providing individual sockets on a substrate surface with a microspherical adhesive to be retained in, thereby reducing or eliminating transfer of the microspherical adhesive upon removal of an object adhered thereto. The individual sockets are conveniently provided by a binder material bonded to the substrate surface.

In accordance with the present invention, adhesive layer 13 preferably comprises a binder material having embedded therein and protruding from the exposed surface thereof, elastomeric, inherently tacky, acrylate copolymer microspheres of the type disclosed and claimed in the '140 patent. These microspheres consist essentially of about 90 to 99.5 percent by weight of at least one acyl acrylate ester and about 10 to about 0.5 weight percent of at least one monomer selected from the group consisting of substantially oil-insoluble, water-soluble, ionic monomers and maleic anhydride. The normally tacky and elastomeric copolymer spheres are small in size, having diameters in the range of about 1 to 250 micrometers, with the majority of the spheres falling in the range of about 5 to about 150 micrometers.

The binder compound utilized to anchor the spheres to prevent the removal from the adhesive surface should be compatible with the microspheres and the table or desktop 5 illustrated in FIG. 1, i.e., it should neither chemically attack the polymer spheres or tabletop 5 nor act as a solvent for them. In other words, the anchoring binder should be inert toward the microspheres and the surface to which the article of the invention is applied. The film-forming resins having a high degree of adhesion for the acrylate copolymer spheres generally are effective to anchor the spheres to a substrate. Relatively hard resins such as epoxies and nitrocellulose and relatively soft resins such as acrylates and vinyl ethers are examples of suitable film-forming anchoring binder resins.

As explained in the '731 patent, where necessary, conventional primers can be conveniently utilized between adhesive layer 13 and plastic layer 15. The art of priming substrates to allow wetting or bonding of a variety of coatings is well known, such as disclosed in U.S. Pat. Nos. 2,328,066 and 2,926,105, which disclose primers for cellophane plastic materials, U.S. Pat. No. 2,927,868, which discloses primers for acetate films, and U.S. Pat. No. 2,897,960 which discloses primers for polyvinylchloride films, all of which are incorporated by reference herein.

Application of adhesive layer 13 to plastic layer 15 can be undertaken in any conventional manner. For example, the mixture may be coated to a desired thickness, using, for example, a knife, a wire-wound bar or a rotogravure roll. Alternatively, the mixture may be sprayed onto the plastic 15.

Although all the embodiments shown in FIGS. 2a–2f, illustrate adhesive layer 13 across the entire surface of plastic 15, it will be appreciated that one advantage of the articles of the invention is that the articles may be made with adhesive 13 present only around the perimeter of the article. This would allow the placement of photographs or other preprinted sheets to be placed under the control layer 19.

Of course it is within the invention that the articles of the invention may be adhered "permanently" to desk or tabletop 5. In these embodiments, adhesive 13 may be any of those commercially available adhesives described in assignees copending patent application Ser. No. 07/929,685, which was cross-referenced above. Suitable permanent adhesives are also discussed below.

Plastic sheet 15 as shown in FIGS. 2a–2c, as well as in FIGS. 3a–3c, 5, 7, and 9, may actually be plastic or paper. When layer 15 is paper, layers 13 and 15 may comprise a single product such as that known under the trade designation "3M Laser Label" sheets, number 7701, which are available in 8.5 by 11 inch sheets suitable for use with a personal computer printer such as the printers known under the trade designations "HP Deskjet 500C" and "HP LaserJet IIIp", both available from Hewlett Packard Corporation, Palo Alto, Calif. Laser label sheets having a model number 7701 comprise a cellulose paper layer 15 having an adhesive layer 13 thereon, the adhesive layer 13 in turn having a release liner 25 (FIGS. 3 and 4). The advantage of these such laser label sheets will become apparent with a description of the embodiments in FIGS. 3 and 4.

Referring again to embodiment 10 illustrated in FIG. 2a, adhesive layer 17 is a permanent adhesive, such as those described above applicable for use for adhesive layer 13. Adhesive for use in adhesive layer 17 should be inert to layer 15 and layer 19, i.e., adhesive 17 should not chemically attack the materials of layers 15 and 19.

Control layer 19 as illustrated in FIGS. 2a–2f has a control surface 2 which is a microstructured surface consisting of tiny pyramids [approx. 0.01 to 0.014 inches (about $2.54 \times 10^{-3}$ to about $3.56 \times 10^{-2}$ cm) in height]. This microstructured surface gives a precise functional control surface 2 which is uniform in texture which affords good aggressive grab to a mouse tracking ball, but which is preferably not abrasive to the user's hand. A control surface preferably provides a smooth uniform and predictable movement to the pointer or cursor on the computer screen. The plastic material which comprises control layer 19 is preferably transparent and colorless allowing any printing which appears on plastic surface 15 (such as represented by ink layer 21 and FIGS. 2b and 2c) to be seen. Alternatively, pigments and/or dyes may be incorporated into control layer 19 to create a marbled appearance, or a colored opaque appearance.

Ink 21 is preferably any ink or pigment which may printed by typical personal computer printers, and which will adhere to paper or film layer 15. As illustrated in FIGS. 2b and 2c, ink layer 21 may either be positioned at the entire cross-section of the article as illustrated in FIG. 2b, or there may be areas devoid of ink such as illustrated in FIG. 2c, as when words or other characters are printed on layer 15.

Figure 2E:
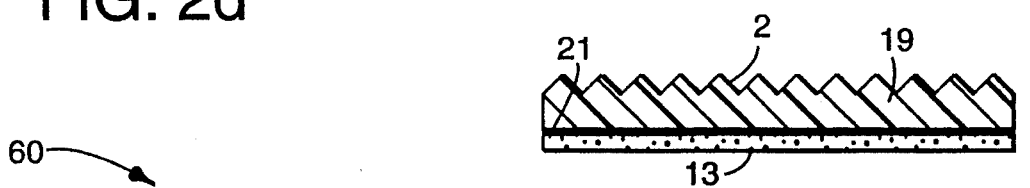
Figure 2F:
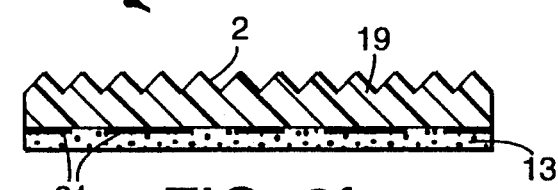

FIGS. 2d–2f illustrate alternative embodiments 40, 50, and 60 to those illustrated in 2a–2c, respectively. Embodiment 40 illustrated in FIG. 2d consists simply of adhesive 13 (preferably removable and rebondable) adhered to bottom surface of control layer 19. FIGS. 2e and 2f illustrate embodiments similar to that illustrated in FIG. 2d, with the inclusion of ink layer 21 printed or adhered to the noncontrol surface, as explained previously.

Figure 3A:
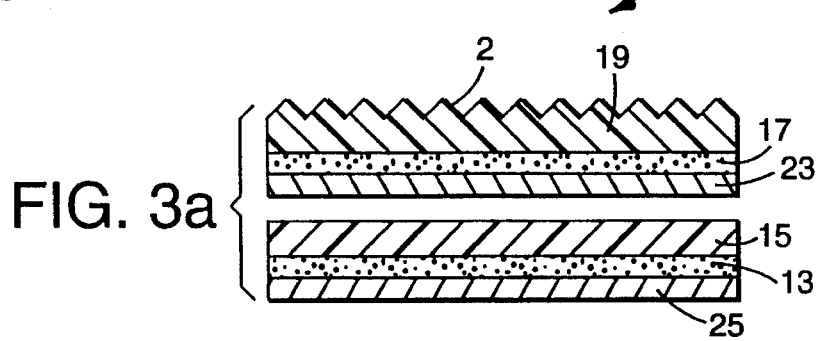
FIGS. 3a–3c are cross-section views of kit embodiments of the articles of the invention.
Figure 3B:
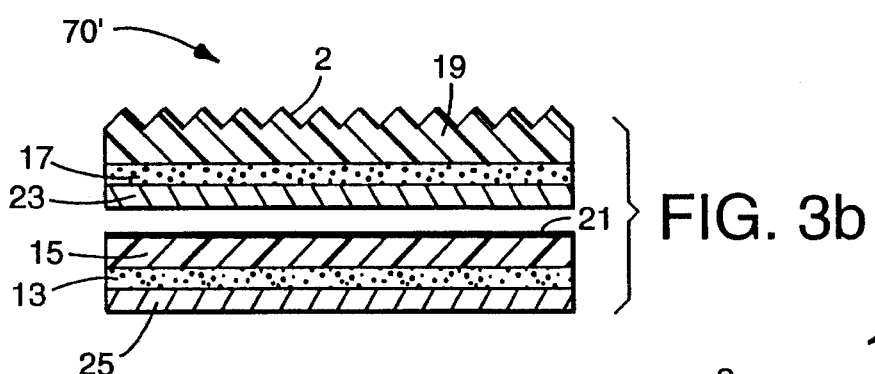
Figure 3C:
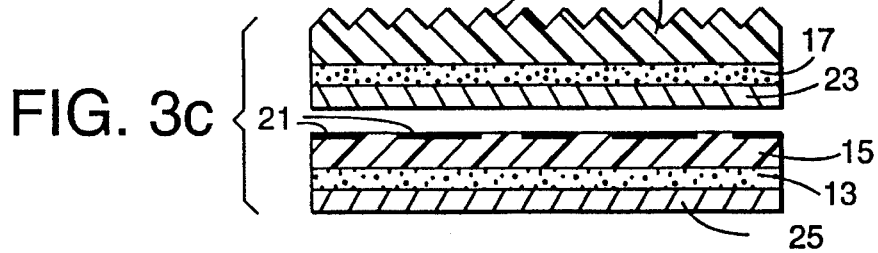
Figure 4:
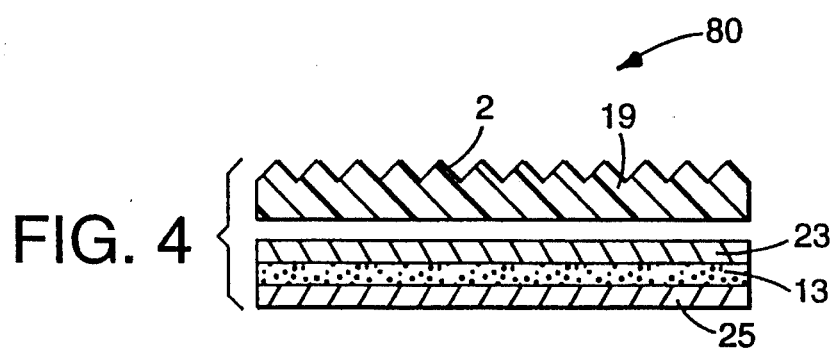
FIG. 4 is a cross-section view of another kit embodiment of the invention.
Figure 5:
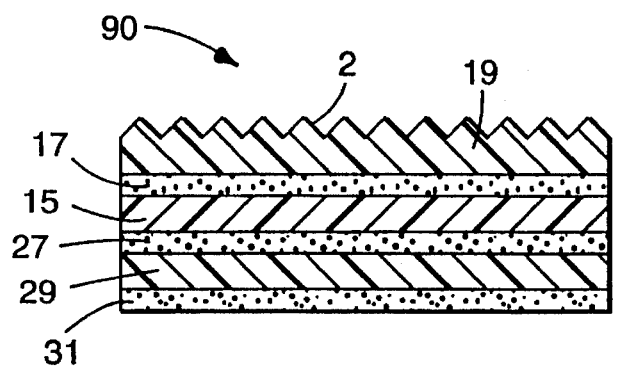
FIGS. 5 and 6 illustrate in cross-section other alternatives to the embodiment shown in FIG. 2d.
Figure 6:
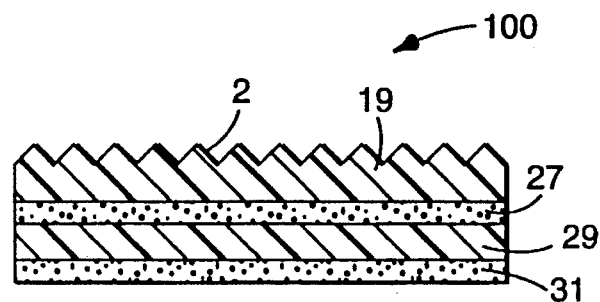
Figure 7:
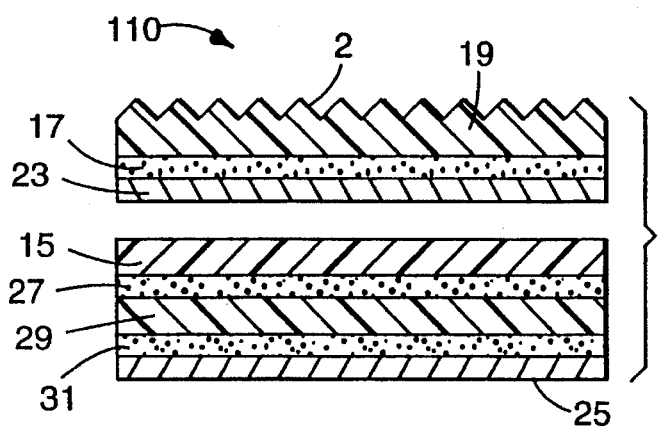

FIGS. 3 and 4 illustrate kit embodiments of the present invention. For example, embodiment 70 is represented by two sheet-like materials, the first sheet-like material comprised of an adhesive layer 17 having a release liner 23 attached thereto, the adhesive in turn attached to control layer 19. A second sheet-like material of the kit of FIG. 3a comprises an adhesive layer 13 (preferably a rebondable adhesive) having a release liner 25, the adhesive layer 13 to attached to paper or plastic film layer 15. In embodiment 70 of FIG. 3a, the sheet-like portion consisting of layers 13, 15 and 25 is available under the trade designation "3M Laser Label" sheets, model no. 7701, which are the 8.5 by 11 inch sheets previously mentioned. Adhesive layer 17 is typically and preferably a permanent adhesive known under the trade designation "3M Adhesive Transfer Tape 950" from 3M, which is an acrylate-based permanent adhesive.

Kit embodiments 70' and 70" as shown in FIGS. 3b and 3c, respectively, are similar to kit embodiment 70 of FIG. 3a except for the provision of ink layers 21 as previously mentioned.

The kits of FIGS. 3a–3c are especially useful for users having personal computers and printers. These kits allow the user to print on the surface 15 as shown in FIGS. 3b and 3c by inserting laser label sheets such as those described above into the paper holder of a printer. Essentially any information that can be typed or graphically shown on the computer screen can be printed on the layer 15 such as important, frequently called telephone numbers, advertising logos, designs, and the like.

Referring now to FIG. 4, embodiment 80 illustrated is another two-piece kit. However, the first sheet member of the kit is simply a control layer 19 having a control surface 2, while the second sheet member consists of an adhesive layer 13 (preferably a repositionable adhesive) having on its major surfaces release liners 23 and 25.

Release lining materials can be of any material which does not adhere permanently to the adhesive. Suitable release materials include paper or polyesters which have been treated with a non-adhering substance such as a neat silicone or a fluorocarbon. Alternatively, the release material may be a suspension emulsion, or dispersion of a silicone- or a fluorocarbon-based substance applied directly to the adhesive layer by any method including spraying. Silicone-treated paper is commercially available from James River Corporation (Parchment, Mich.) and a silicone-based emulsion for spray applications is commercially available from Paper-chem Labs (Rockhill, N.C.).

If layer 15 in any embodiment is plastic, suitable materials include those useful in forming the control layer 19, including polyester, polyvinyl chloride, polystyrene, polypropylene, polyethylene, polybutylene, copolymers of polyethylene and vinyl acetate, cellulose di- and triacetate, and ethyl cellulose. One useful polyester film commercially available is that known under the trade designation "Mylar" from E. I. DuPont de Nemours & Company, Wilmington, Del.

As stated previously, it is possible to repositionably adhere the control layer 19 in all embodiments directly onto the desk or other surface by use of a highly plasticized control layer 19. Suitable plasticizers for this purpose include both so-called "internal" and "external" plasticizers, the former meaning a copolymer of a monomer of low $T_g$, the latter meaning a compound not chemically bound to the polymer. Polyvinyl chloride is a preferred polymer for use in plastic layers since it is compatible with a variety of plasticizers and because the plasticized polymer remains quite stable physically and chemically for long periods of time. Cost, odor and other factors may be important in selecting the plasticizer. Suitable external plasticizers for polyvinyl chloride include tritolyl phosphate, dinonyl phthalate, dioctyl sebacate, dioctyl phthalate, and di-2-ethylhexyl phthalate. Dimethyl phthalate is typically used to plasticize cellulose acetate. External plasticizers may be incorporated into the polymer at a weight percentage ranging from 1 to about 50 weight percent.

Referring now to FIGS. 5–8, therein illustrated are constructions 90, 100, 110 and 120, which are alternatives to embodiments of 10, 10, 70, and 80, respectively. In FIGS. 5–8, adhesive layer 13 of embodiments 10, 70 and 80 is replaced by a three layer structure consisting of an adhesive layer 27 which adheres plastic or paper layer 29 to plastic or paper layer 15, and another adhesive layer 31, which as above described may either be a permanent adhesive or a repositionable adhesive, preferably the latter.

Figure 9:
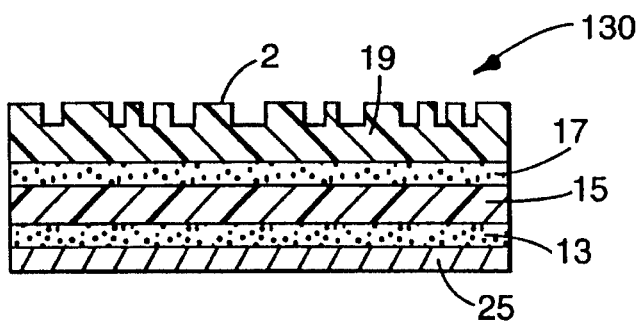
FIG. 9 is a cross-section of an alternative embodiment showing a different microstructured surface.

Illustrated in FIG. 9 is embodiment 130, an alternative of embodiment 10 illustrated in FIG. 2a. Embodiment 130 illustrated in FIG. 9 differs by having a different control surface 2 formed in the control layer 19. The control surface 2 illustrated in FIG. 9 is commonly referred to as a continuous, uniform random texture, and is described generally in U.S. Pat. No. 4,799,054. The '054 patent describes this surface as a matte surface texture comprised of a great number of plateau-like protrusions scattered at random on the surface and each having a top at the same level. The spaces between the protrusions must be small compared to the surface area of the tracking ball which contacts the control surface 2. A suitable material for use as this surface is a polyvinyl chloride, available from Goss Plastics Film Corporation of Los Angeles, Calif., under the trade designation "Goss 48.4". This product is scratch-resistant and is available in thickness ranging from about 10 to 20 mils ($2.54 \times 10^{-2}$ to $5.08 \times 10^{-2}$ cm).

Other materials which may be used for control layer 19 include those mentioned in the '054 patent including a textured polycarbonate material available from General Electric Company of Pittsfield, Mass., under the trademark "Lexan", or from any of Mobil Chemical Corporation, Plastics Division, of Pittsburgh, Pa., Rohm and Haas Company of Philadelphia, Pa., and Humko Shefield Chemical of Memphis, Tenn. Polystyrene, polyester, or acetate films may also be used as well as urethane as previously discussed.

Control layer 19 preferably has hardness ranging from about 70 durometer to about 140 durometer, measured on the Shore "A" durometer scale. Such measurements should be made using an apparatus substantially meeting the American Society for Testing and Materials Standard D 2240-68.

It may also be beneficial to provide the articles of the invention with antistatic properties. A simple wire attachment may utilized for this purpose. Antistatic agents or conductivity enhancers may be applied to the surface of the finished article or incorporated into the bulk of the plastic polymer (when polymeric layers are employed). The main groups of useful and preferred antistatic agents include ionic compounds, such as quaternary ammonium salts and amines and hydrophilic compounds such as polyglycols and ethylene oxide derivatives. These antistats increase the electrical conductivity of the material by increasing its surface ionic activity. Other useful but less preferred methods may be used, such as incorporation of small amounts of electrically conductive metallic staple fibers, or certain types of carbon black, into the polymer layer(s).

Antistatic agents applied by surface treatment may be applied to plastic polymer layers by dipping, wiping, or spraying a solution or dispersion of the antistat in water or other inexpensive, volatile solvent.

Internal antistatic agents are incorporated into the bulk of the polymer from where it gradually migrates to the surface. Preferred are those internal antistatic agents which are reasonably compatible with the polymer, diffuses through the polymer adequately, and has thermal stability suitable for the end use of the article. The antistatic agent also should not cause undesirable side effects on the article.

The type and amount of internal antistatic agent incorporated into a polymer layer depends greatly on the composition of the polymer. Nonionic ethoxylated compounds are preferred for polyvinyl chloride; N-alkyl diethanolamines are preferred for polyolefins; and quaternary ammonium compounds are preferred for polyurethanes. The amount of internal antistatic agent generally ranges from about 0.05 weight percent to about 5 weight percent, based on total weight of polymer and antistatic agent. A more comprehensive list of both external and internal antistatic agents and there selected use in various polymer systems is available in Kirk-Othmer, *Encyclopedia of Chemical Technology*, 3rd Edition, Vol. 3, pp. 149–183, John Wiley & Sons (New York, 1978), which is incorporated herein by reference.

The control layer may also have a water and oil repellant and soil resistant coating thereon (or added to the polymer melt composition of the control layer prior to formation of the control layer). Suitable coatings include those commonly employed in fabric and carpet treatment, such as various fluorinated compounds. The fluorinated compounds may be incorporated in most conventional plastics either by copolymerization of reactive fluorinated intermediates or by the inclusion of fluorinated compounds as additives.

Fluorinated intermediates can generally be represented by the formula $R_f$—X—Y, wherein $R_f$ is a fluoroaliphatic group, X is a divalent linking group, typically a hydrocarbon, between the fluoroaliphatic group and a reactive functional group Y.

Typical examples of reactive intermediates useful in the present invention include alcohols, which can react with isocyanate groups in forming the preferred polyurethane control layers. Useful alcohols include $F(CF_2)_8$—$CH_2$—$CH_2OH$ and $F(CF_2)_8$—$SO_2$—NR—$CH_2$—$CH_2OH$, and others disclosed in U.S. Pat. No. 4,264,484 (incorporated by reference herein). Vinyl-functional compounds, such as $F(CF_2)_8$—$CH_2$—$CH_2$—O—C(O)—CH=$CH_2$, may be useful in acrylic films. Other useful functional groups on fluoromonomers include acrylates, epoxides, diols, diamines, diacids, and functional silanes. Other useful fluorinated compositions are the blends disclosed in U.S. Pat. Nos. 4,560,487 and 4,681,790, both of which are incorporated by reference herein. Reactive fluorinated intermediates, when incorporated either as comonomers in polymeric systems or as additives, influence the surface properties of the plastic control surface. A useful range, depending on the particular degree of repellency desired, is from about 5 to 70% by weight of a fluorinated monomer.

Alternatively, partially fluorinated, low molecular weight substances may be included as additives to conventional hydrocarbon polymers during melt extrusion. The fluorinated additives migrate to the surface at rates that depend generally on the melt viscosity of the bulk plastic. As little as 0.01 weight percent of a low molecular weight copolymer of perfluoroalkylethyl methacrylate and acrylamide (85/15) significantly lowers the surface tension of an acrylic polymer film. Similar effects are seen by using perfluorosulfonic acids in polycarbonates, and perfluoroalkylethyl stearates in high density polyethylene. Generally about 0.1 to 1.0% by weight of the fluorinated additive is employed.

Since proper operation of a personal computer mouse relies on the rotational movement of the tracking member maintaining a constant relationship with a linear movement of the mouse itself, it is important that control surface 2 be provided with some texture, as mouse track balls may themselves be provided with smooth surfaces. Selecting a material of proper texture for the control layer 19 can, therefore, usually increase the frictional engagement between the track ball and the control surface 2. Also, the inclusion of a texture on control surface 2 provides even better operation with a mouse having a track ball including a rubber-like outer surface. This frictional engagement facilitates maintaining a 1:1 relationship between the linear mouse movement and track ball rotation.

As alluded to in the discussion of application of graphic symbols to the articles of invention using inks 21 applied to a substrate member (see FIGS. 2*b*, 2*c*, 3*b* and 3*c*) it is also possible to apply graphic symbols such as by the application of ink, to the back side of control layer 19 not having the control surface 2, as illustrated in FIGS. 2*e* and 2*f*. In all embodiments of the invention, difficulties can thus be avoided that arise as to the information being worn off or interfering with the operation of track ball when the information is printed directly on control surface 2. Ink jet printers can be used to print directly onto the control surface, but this is not preferred.

Control surface 2 is defined by an array (i.e., an orderly arrangement such as a regularly repeating pattern) of precisely shaped protrusions thereon. Protrusions may be discrete elements laminated to control layer 19 or may be integral parts of control layer 19, i.e., control layer 19 may be structured in the form of protrusions 22.

In preferred embodiments of the invention, protrusions on control surface 2 comprise pyramidal protrusions, i.e., pyramids with polygonal bases or pyramidal frustums with polygonal bases. Each polygonal base is disposed on a first surface of control layer 19 and is defined by a plurality of line segments which lie in or on the plane of the control layer.

The polygonal bases of the protrusions are preferably selected from the group consisting of triangular bases, quadrilateral bases, pentagonal bases, hexagonal bases, heptagonal bases, octagonal bases, nonagonal bases and decagonal bases. In a most preferred embodiment, as illustrated in all FIGS. except FIG. 9, the protrusions are triangular pyramids, i.e., three-sided pyramids having triangular bases. The polygonal bases of the protrusions are typically immediately adjacent one another such that there is no land separating the polygonal bases.

The line segments defining the sides of the polygonal base of each pyramidal protrusion are preferably relatively equal in length, but need not be. By relatively equal, it is meant that the length of the shortest line segment is equal to at least about 50 percent of the length of the longest line segment. Most preferably, the line segments defining the sides of the polygonal base of each pyramidal protrusion are equal in length. Each line segment is typically between about 5 and about 75 mils (125 and 1,875 micrometers), but preferably is between about 5 and about 30 mils (125 and 750 micrometers), and most preferably between about 10 and about 20 mils (250 and 500 micrometers), in length.

As previously stated, referring again to FIGS. 3 and 4, the sheeting of the invention can include optional release liners and optional permanent adhesive layers. Permanent adhesive layers typically comprise an adhesive selected to provide a strong bond to the substrate article to which the resultant sheeting is to be applied. For example, heat-activated adhesives, pressure-sensitive adhesives, and mixtures thereof can be used. An illustrative example of a useful adhesive is that known under the trade designation "3M Adhesive Transfer Tape 950" from Minnesota Mining and Manufacturing Company. Many suitable epoxy, urethane, and acrylic adhesives are commercially available.

In some instances, the protrusions of the control surface may be made of a first, relatively hard and highly durable material, and the control layer 19 may be made of a relatively more flexible material. Further, the material of the protrusions can comprise an abrasive or other filler. Further, all or a portion of each protrusion can be filled with a fluid, e.g., a gas such as air or nitrogen. If a gas were used, the pressure of the gas within each protrusion would have to be selected to provide the protrusions with the desired amount of compressibility.

Properly constructed articles of the invention generally exhibit a combination of high durability and friction due to the coupling of hard protrusions (e.g., polycarbonate), which are typically substantially incompressible and non-collapsible, with a more conformable, flexible material (e.g., polyurethane) that results in a more cushioned impact during use.

The control layer of some embodiments of articles of the invention can be made using techniques which are somewhat similar to those used to make cube-corner retroreflective sheetings. It will be understood, however, that the control layer is preferably transparent, and can be made in a variety of transparent colors if desired. For example, referring to FIG. 2a, control layer 19 can be made such that it will retroreflect less than about 10 percent of a beam of electromagnetic radiation which is incident at any angle to control surface 2, the electromagnetic radiation having any wavelength within the visible light or infrared radiation regions, i.e., wavelengths ranging from about 0.39 micrometers to about 1,000 micrometers. Thus, at least a portion of control layer 19 can have a structure similar to retroreflective sheetings, but need not be retroreflective. This means that control layer 19 can be made of less expensive materials because optical performance is not a concern. Further, control layer 19 need not necessarily be manufactured in as precise a manner as retroreflective sheetings since optical performance is not needed.

A control layer 19 useful in the invention may be formed by cutting a series of v-shaped grooves into a solid sheeting, molding a sheeting with the desired precisely shaped protrusions thereon, or molding precisely shaped protrusions and then applying them to a desired backing sheet. Many of the techniques used for fabricating cube-corner retroreflective sheeting may be used to form the control layers useful in the invention, with the important advantage that the optical properties critical to retroreflective sheetings are not necessary for sheets of the invention. U.S. Pat. No. 4,576,850 (Martens), which is incorporated in its entirety herein by reference, discloses a process for replicating microstructured surfaces that may be used in making sheetings of the invention. U.S. Pat. No. 3,689,346 (Rowland) also discloses a method comprising applying a hardenable molding material over a mold having a multiplicity of cube-corner formations therein.

Desired flexibility, elasticity, and conformability of the inventive article is dependent in part upon the desk or other surface to which it is to be applied. It is preferred that the repositionable article be somewhat elastic and conformable so as to give or compress under pressure of a track ball when the article is used as a mouse pad. During use, it is possible that the table or surface may be flexible, such as when the mouse pad of the invention is placed over a conventional "foam-backed" mouse pad. Accordingly, a mouse pad of the invention for use thereon should be flexible, as described above.

In general, an article of the invention useful as a mouse pad can be repositionably secured to any surface over which the mouse traverses.

Other modifications and uses of the articles of the invention will become apparent to those skilled in the art. The articles of the invention may be of use in airplanes as covers for pull-down trays, or as coasters for drink containers. The control surface may have thereon a coating such that it will receive indicia, such as a 95/5 weight ratio coating of methyl methacrylate/N-vinyl pyrrolidone copolymer such as those coatings typically applied to the face of overhead transparencies. The article may be formed to contain a pocket such that photos or artwork can be inserted therein, or folding lines may be formed into the article such that it forms a flap wherein art or photos can be contained. These modifications and alterations of the invention are considered within the scope of the following claims.

What is claimed is:

1. A repositionable article having a microstructured surface comprising:
   a) a removable and rebondable adhesive layer having first and second surfaces;
   b) a control layer having a control surface and a back surface, the second surface of the adhesive layer adhered to the back surface of the control layer, the control surface defined by an array of a plurality of precisely shaped raised regions and a plurality of recessed regions.

2. Article in accordance with claim 1, wherein said adhesive layer comprises a rebondable adhesive exhibiting a peel adhesion ranging from about 22 to about 275 grams per cm.

3. Article in accordance with claim 1, wherein said adhesive layer comprises a binder material having embedded therein and protruding from an exposed surface thereof, elastomeric, inherently tacky, acrylate copolymer microspheres.

4. Article in accordance with claim 1, wherein said control layer is transparent.

5. Article in accordance with claim 1, wherein said control layer consists essentially of a polymeric organic material.

6. Article in accordance with claim 1 having a graphic representation positioned between the adhesive layer and control layer.

7. Article in accordance with claim 1 having a graphic representation positioned on the control surface.

8. Article in accordance with claim 1 having an antistatic agent dispersed in the control layer.

9. Article in accordance with claim 1 having an antistatic agent coated onto the control surface.

10. Article in accordance with claim 1 having a fluorochemical dispersed in the control layer.

11. Article in accordance with claim 1 having a fluorochemical coated onto the control surface.

12. Article in accordance with claim 1 having a copolymer coating on the control surface, the copolymer comprising about 95 weight percent of polymerized methyl methacrylate units and about 5 weight percent polymerized N-vinyl pyrrolidone units.

13. Article in accordance with claim 1 wherein said adhesive comprises a pressure-sensitive adhesive layer comprising a plurality of spaced clumps of particles substantially uniformly distributed over and protruding from one face of the pressure-sensitive adhesive layer, the tips of the clumps of particles being substantially free from the pressure-sensitive adhesive.

14. A repositionable article having a microstructured surface comprising:
   a) a removable and rebondable first adhesive layer having first and second surfaces;
   b) a substrate layer having first and second surfaces, the second surface of the first adhesive layer adhered to the first surface of the substrate layer;
   c) a second adhesive layer having first and second surfaces, the first surface of the second adhesive layer adhered to the second surface of the substrate layer; and
   d) a control layer having a control surface and a back surface, the back surface adhered to the second surface of the second adhesive layer, the control surface defined by an array of a plurality of precisely shaped raised regions and a plurality of recessed regions.

15. Article in accordance with claim 14 wherein said substrate layer is selected from a group consisting of plastic and paper.

16. Article in accordance with claim 14 wherein said first adhesive layer comprises a binder material having embedded therein and protruding from an exposed surface thereof, elastomeric, inherently tacky, acrylate copolymer microspheres.

17. Article in accordance with claim 14 wherein said first adhesive layer comprises a pressure-sensitive adhesive layer comprising a plurality of spaced clumps of particles substantially uniformly distributed over and protruding from one face of the pressure-sensitive adhesive layer, the tips of the clumps of particles being substantially free from the pressure-sensitive adhesive.

18. Article in accordance with claim 14, wherein said second adhesive layer is a permanent adhesive.

19. Article in accordance with claim 14, wherein said control surface consists of a uniform array of a plurality of pyramids having a height ranging from about $2.54 \times 10^{-3}$ cm to about 0.1 cm.

20. Article in accordance with claim 14 wherein said substrate layer is a foamed material.

21. Article in accordance with claim 14 wherein said control layer is transparent.

22. Article in accordance with claim 21, wherein said substrate layer has between its second surface and the first surface of said second adhesive a graphic design adhered therebetween.

23. Article in accordance with claim 14, wherein said first adhesive layer has a peel adhesion ranging from about 22 to about 275 grams per cm.

24. A kit for use in producing a repositionable sheet member, the kit comprising:
   a) a first sheet member consisting of:
      1) a first release liner material having first and second surfaces;
      2) a first adhesive layer having first and second surfaces, the second surface of the first adhesive layer removably adhered to the first surface of the first release liner material; and
      3) a control layer having a control surface and a back surface, the back surface of the control layer adhered permanently to the first surface of the first adhesive layer, the control surface defined by an array of a plurality of precisely shaped raised regions and a plurality of recessed regions; and
   b) a second sheet material consisting of:
      1) a second release liner material having first and second surfaces;
      2) a removable and rebondable second adhesive layer having first and second surfaces, the second surface of the second adhesive layer adhered to the first surface of the second release liner material; and
      3) a substrate layer having first and second surfaces, the second surface of the substrate layer adhered to the first surface of the second adhesive layer, and the first surface of the substrate layer adapted to be permanently adhered to the first surface of the first adhesive layer when the first release material is removed from the first adhesive layer and the first adhesive layer and substrate layer are joined.

25. Kit in accordance with claim 24 wherein said second adhesive layer comprises a binder material having embedded therein and protruding from an exposed surface thereof, elastomeric, inherently tacky, acrylate copolymer microspheres.

26. Kit in accordance with claim 24 wherein said second adhesive layer comprises a pressure-sensitive adhesive layer comprising a plurality of spaced clumps of particles substantially uniformly distributed over and protruding from one face of the pressure-sensitive adhesive layer, the tips of the clumps of particles being substantially free from the pressure-sensitive adhesive.

27. Kit in accordance with claim 24 further comprising a graphic layer, the graphic layer positioned either between the first adhesive layer and the control layer, or adhered to the second surface of the substrate layer.

28. A kit adapted to be manipulated by the user into a repositionable article having a microstructured surface, comprising:
   a) a first sheet material having a control surface and a back surface, the control surface defined by an array of a plurality of precisely shaped raised regions and a plurality of recessed regions; and
   b) a second sheet material comprising:
      1) a first release material having first and second surfaces;
      2) a removable and rebondable adhesive layer adapted to be attached to the back surface of the control layer, the adhesive layer having first and second surfaces, the second surface of the adhesive layer removably adhered to the first surface of the first release material; and
      3) a second release material having first and second surfaces, the second surface of the second release material removably adhered to the first surface of the adhesive layer.

29. Kit in accordance with claim 28 wherein said adhesive layer comprises a binder material having embedded therein and protruding from an exposed surface thereof, elastomeric, inherently tacky, acrylate copolymer microspheres.

30. Kit in accordance with claim 28 wherein said adhesive layer comprises a pressure-sensitive adhesive layer comprising a plurality of spaced clumps of particles substantially uniformly distributed over and protruding from one face of the pressure-sensitive adhesive layer, the tips of the clumps of particles being substantially free from the pressure-sensitive adhesive.

31. A repositionable article having a microstructured surface comprising:
   a) a removable and rebondable first adhesive layer having first and second surfaces;
   b) a first substrate material having first and second surfaces, the second surface of the first substrate material adhered to the first surface of the first adhesive layer;
   c) a second adhesive layer having first and second surfaces, the second surface of the second adhesive layer adhered to the first surface of the first substrate layer;
   d) a second substrate layer having first and second surfaces, the second surface of the second substrate layer adhered to the first surface of the second adhesive layer;
   e) a third adhesive layer having first and second surfaces, the second surface of the third adhesive layer adhered to the first surface of the second substrate material; and
   f) a control layer having a control surface and back surface, the back surface of the control layer adhered to the first surface of the third adhesive layer, the control surface defined by an array of a plurality of precisely shaped raised regions and a plurality of recessed regions.

32. Kit in accordance with claim 31 wherein said first adhesive layer comprises a binder material having embedded therein and protruding from an exposed surface thereof, elastomeric, inherently tacky, acrylate copolymer microspheres.

33. Kit in accordance with claim 31 wherein said first adhesive layer comprises a pressure-sensitive adhesive layer comprising a plurality of spaced clumps of particles substantially uniformly distributed over and protruding from one face of the pressure-sensitive adhesive layer, the tips of the clumps of particles being substantially free from the pressure-sensitive adhesive.

34. Kit in accordance with claim 31 wherein said control layer is transparent.

35. Kit in accordance with claim 31 wherein a graphics layer lies in between said second substrate layer and said third adhesive layer.

36. A kit including first and second sheet-like articles, the kit comprising;
a) the first sheet-like article consisting of:
1) a first release material having first and second surfaces;
2) a first adhesive layer having first and second surfaces, the second surface of the first adhesive layer removably adhered to the first surface of the first release layer; and
3) a control layer having a control surface and a back surface, the back surface adhered to the first surface of the first adhesive layer, the control layer defined as above; and
b) said second sheet-like article consisting of:
1) a second release material having first and second surfaces;
2) a removable and rebondable second adhesive layer having first and second surfaces, the second surface of the second adhesive layer removably adhered to the first surface of the second release material;
3) a first substrate layer having first and second surfaces, the second surface of the first substrate layer adhered to the first surface of the second adhesive layer;
4) a third adhesive layer having first and second surfaces, the second surface of a third adhesive layer adhered to the first surface of the first substrate layer; and
5) a second substrate layer having first and second surfaces, the second surface of the second substrate layer adhered to the first surface of the third adhesive layer.

37. Kit in accordance with claim 36 wherein said second adhesive layer comprises a binder material having embedded therein and protruding from an exposed surface thereof, elastomeric, inherently tacky, acrylate copolymer microspheres.

38. Kit in accordance with claim 36 wherein said second adhesive layer comprises a pressure-sensitive adhesive layer comprising a plurality of spaced clumps of particles substantially uniformly distributed over and protruding from one face of the pressure-sensitive adhesive layer, the tips of the clumps of particles being substantially free from the pressure-sensitive adhesive.

39. Kit in accordance with claim 36, wherein said control layer is transparent.

40. Article in accordance with claim 36 which further comprises a graphics layer adhered to the first surface of the second substrate.

41. A kit including first and second sheet-like articles comprises;
a) a first sheet-like article consisting of a control layer having a control surface and a back surface, the back surface adapted to be contacted with a second sheet-like article, the control surface defined as above; and
b) a second sheet-like material consisting of:
1) a first release material having first and second surfaces;
2) a removable and rebondable first adhesive layer having first and second surfaces, the second surface of the first adhesive layer removably adhered to the first surface of the first release material;
3) a substrate layer having first and second surfaces, the second surface of the substrate layer adhered to the first surface of the first adhesive layer;
4) a second adhesive layer having first and second surfaces, the second surface of the second adhesive layer adhered to the first surface of the substrate layer; and
5) a second release material having first and second surfaces, the second surface of the second release material removably adhered to the first surface of the second adhesive layer, the second release material and the first release material adapted to be removed from the second sheet-like article, and the first surface of the second adhesive layer adapted to be adhered to the second surface of the control layer.

42. Kit in accordance with claim 41 wherein said first adhesive layer comprises a binder material having embedded therein and protruding from an exposed surface thereof, elastomeric, inherently tacky, acrylate copolymer microspheres.

43. Kit in accordance with claim 41 wherein said first adhesive layer comprises a pressure-sensitive adhesive layer comprising a plurality of spaced clumps of particles substantially uniformly distributed over and protruding from one face of the pressure-sensitive adhesive layer, the tips of the clumps of particles being substantially free from the pressure-sensitive adhesive.

44. A support article from which sheet-like pressure sensitive adhesive-backed articles can be removed, the article comprising a plurality of repositionable articles each having a microstructured surface, each repositionable article comprising:
a) a removable and rebondable adhesive layer having first and second surfaces;
b) a control layer having a control surface and a back surface, the second surface of the adhesive layer adhered to the back surface of the control layer, the control surface defined by an array of a plurality of precisely shaped raised regions and a plurality of recessed regions,
the repositionable articles being relatively disposed so that at least a portion of the control surface contacts at least a portion of the first surface of the adhesive layer of an underlying repositionable article.

45. The support article of claim 44 wherein the repositionable articles are disposed in the form of a stack.

46. The support article of claim 44 wherein the repositionable articles are disposed in the form of a roll.

47. The support article of claim 44 further comprising a support member upon which is mounted one or more of said repositionable articles.

48. A repositionable article having a microstructured surface comprising:

a) a non-adhesive, high friction layer having first and second surfaces;

b) a control layer having a control surface and a back surface, the second surface of the non-adhesive, high friction layer adhered to the back surface of the control layer, the control surface defined by an array of a plurality of precisely shaped raised regions and a plurality of recessed regions.

* * * * *

UNITED STATES PATENT AND TRADEMARK OFFICE
CERTIFICATE OF CORRECTION

PATENT NO.: 5,508,084
DATED: April 16, 1996
INVENTOR(S): Reeves et al.

It is certified that error appears in the above-identified patent and that said Letters Patent is hereby corrected as shown below:

Col. 12, line 43, Delete "2fIllustrate" and insert --2f illustrate--

Signed and Sealed this

Eleventh Day of February, 1997

Attest:

BRUCE LEHMAN

Attesting Officer                Commissioner of Patents and Trademarks